[72] Inventors Donovan L. Garber
North Canton;
James N. Seidelle, Cuyahoga Falls, both of Ohio; John R. Miles, Glenview, Ill.
[21] Appl. No. 793,147
[22] Filed Jan. 22, 1969
[45] Patented Sept. 7, 1971
[73] Assignee The United States of America as represented by the Secretary of the Navy

[54] ELECTRO-OPTICAL SIMULATOR SYSTEM
2 Claims, 2 Drawing Figs.
[52] U.S. Cl. .................................................. 178/6, 35/12, 178/6.8, 178/7.92
[51] Int. Cl. ........................................... G02b 15/80, G09b 9/08, H04n 7/18
[50] Field of Search .............................. 178/6, 6.5, 6.8, 7.92; 35/12 N

[56] References Cited
UNITED STATES PATENTS
| | | | |
|---|---|---|---|
| 2,836,816 | 5/1958 | Allison | 178/6 |
| 3,275,743 | 9/1966 | Conant | 178/6.8 |
| 3,335,217 | 8/1967 | Bassett | 178/6.5 |
| 3,458,651 | 7/1969 | Dryden | 178/7.3 |

*Primary Examiner*—Bernard Konick
*Assistant Examiner*—Howard W. Britton
*Attorneys*—Joseph C. Warfield, John W. Pease and John F. Miller ABSTRACT: In an aircraft simulator training device an assembly of computer controlled movable lens and television camera-and-display combinations is arranged to simulate the effects of yaw, pitch, roll, and changes in azimuth and range.

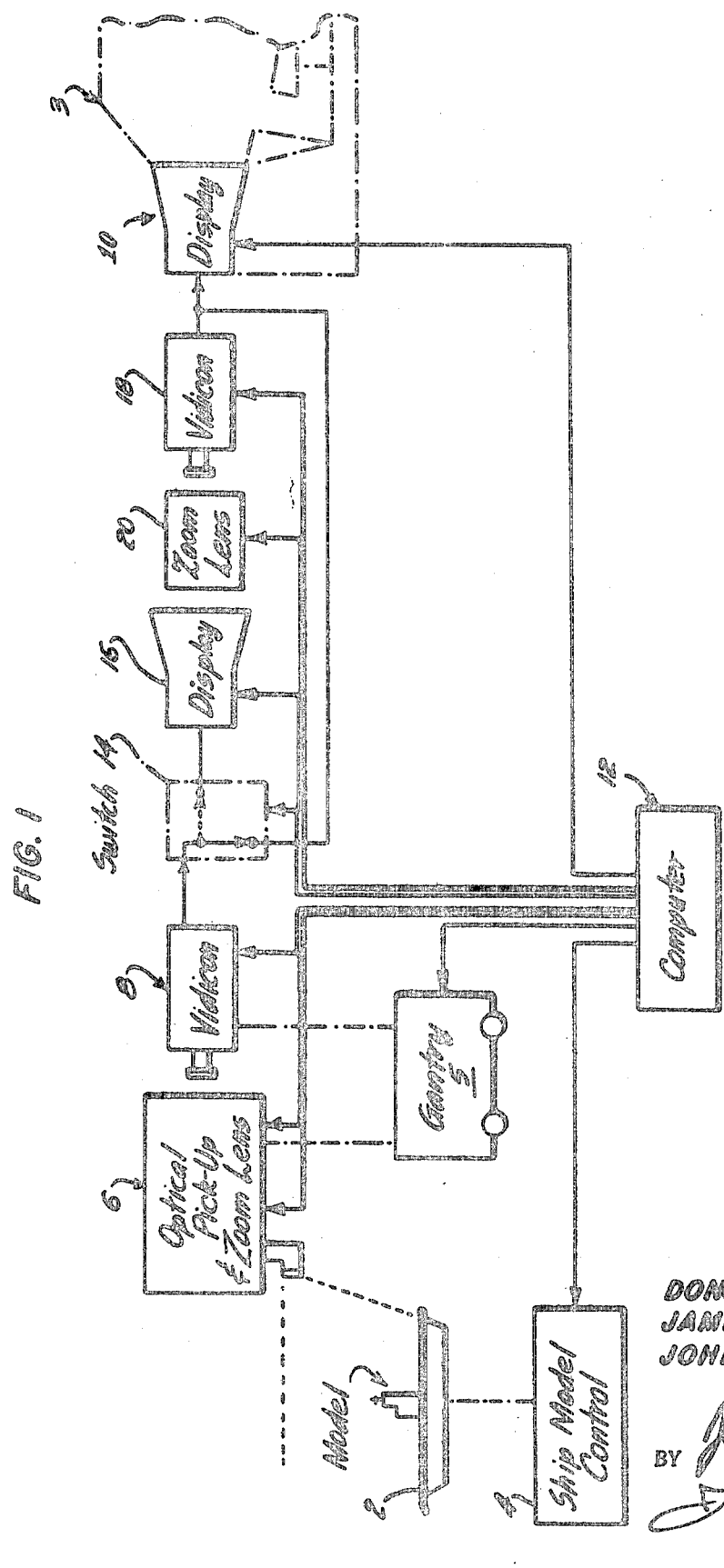

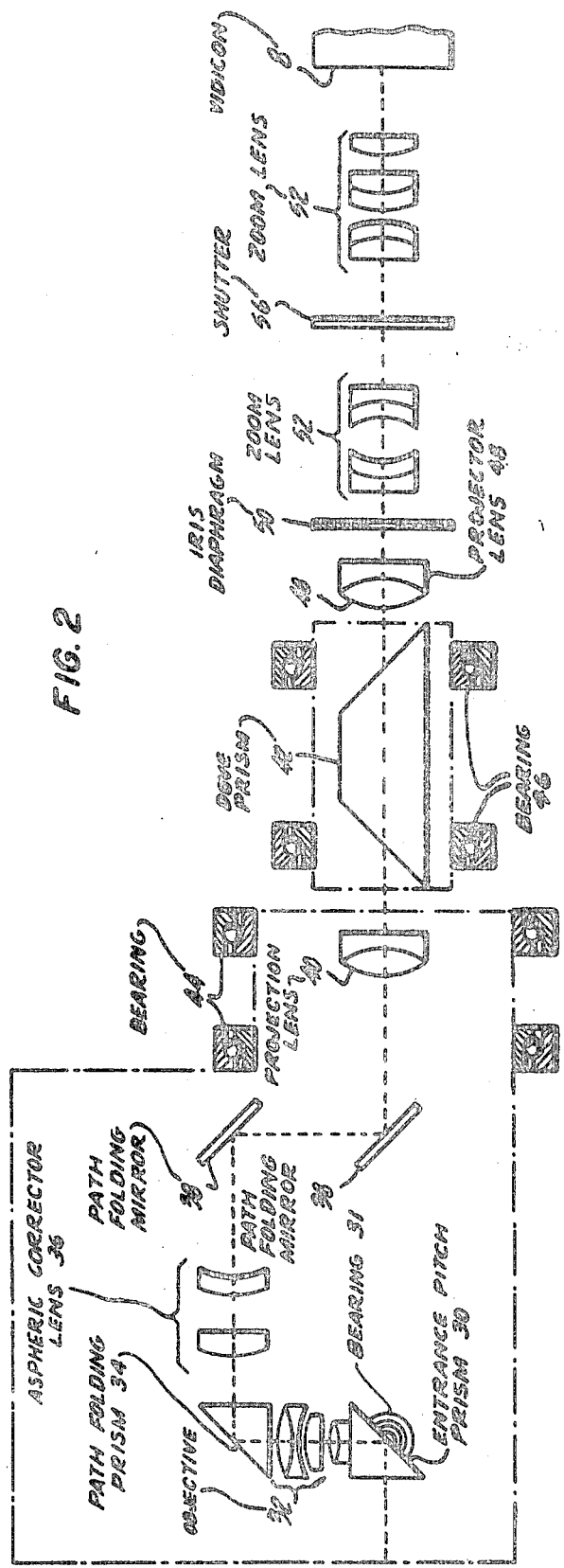

ELECTRO-OPTICAL SIMULATOR SYSTEM

BACKGROUND OF THE INVENTION

The invention is in the field of aircraft training devices, particularly the type which simulates the sensations of flying an aircraft, in part by providing a replica of the cockpit of an aircraft and displaying a changing scene to a trainee in the pilot's position. Various expedients have been tried in the past to operate a replica or simulated aircraft in such manner that a trainee pilot would experience the sensations of flight, particularly the visual stimuli, of real life flying. Prior art trainers have not been completely successful because of a lack of realism in the training effect and excessive complexity of structure.

The present invention solves the problems of the prior art by employing novel servo-controlled optical and television means to simulate aircraft motion and position changes in a realistic manner.

SUMMARY OF THE INVENTION

The invention comprises an electro-optical pickup system for an aircraft simulator training device which provides a wide angle simulation of the view seen by an aircraft pilot who may, for example, be simulating an approach to an aircraft carrier or landing field. A replica of the cockpit of an aircraft is provided with a television display on which a trainee pilot may see a seascape including an aircraft carrier which the aircraft appears to approach. Aircraft movements such as pitch, roll, and yaw are simulated in part by using computer controlled servos to position a pitch entrance prism, an azimuth assembly and a dove prism in the optical system associated with a vidicon to change the view of the seascape on the TV (television) display in a manner similar to that caused by aircraft movements. Changes in apparent range are effected by computer controlled servo operation of zoom lens elements and switch means for interposing an auxiliary television camera-and-display assembly into the TV display circuit.

BRIEF DESCRIPTION OF THE DRAWINGS

FIG. 1 shows the principal elements of the invention.
FIG. 2 shows optical elements of the invention.

DESCRIPTION OF THE PREFERRED EMBODIMENT

FIG. 1 shows a simplified block diagram of an aircraft simulator training device of which the invention is a part. A model 2 of an aircraft carrier can be rotated by servo means in a ship model control unit 4. An optical pickup 6 which includes a zoom lens assembly directs an image of ship model 2 to a vidicon 8 which forwards video information through a switch 14 to a display 10, shown for the purpose of illustration as a single cathode-ray tube. Display 10 is located in a replica of an aircraft 3 complete with seat and controls for a trainee pilot who observes the image of ship model 2 against a seascape, generated by apparatus not shown, on display 10. Display 10 is located in the windshield position in an actual aircraft. The switch 14 can connect the output of vidicon 8 to a display 16 instead of display 10. The image on display 16 can be picked up by a vidicon 18 through a second zoom assembly 20 and forwarded to display 10.

In practice a student pilot seated in aircraft replica 3 observes carrier 2 in a seascape environment on display 10 and operates aircraft controls to simulate a landing approach to the carrier. Part of the effect of being in an actual aircraft approaching a carrier is obtained by decreasing the apparent range from aircraft to carrier through control of the optical pickup 6, switch 14, and zoom lens assembly 20. All of the elements of the invention are controlled by a computer 12 as indicated by the connections shown.

Changes in the apparent distance between aircraft and carrier at close ranges are accomplished by moving optical pickup 6 with respect to carrier 2. This is done by means of a servo operated gantry 5 supporting the optical pickup. Range changes greater than the capability of the gantry system and up to 4,500 feet are made by controlling the zoom lens assembly of the optical pickup. Range changes between 4,500 feet and 36,000 feet are made by controlling the zoom lens assembly 20, switch 14, and vidicon 18 to furnish the video signal to display 10.

The optical pickup 6 of FIG. 1 is shown in detail in FIG. 2. An entrance pitch prism 30 mounted in a bearing 31 picks up the image of aircraft carrier model 2. Prism 30 can be rotated between +45° and −90° to simulate pitch in the aircraft replica 3. It transmits the 60° by 80° field of objective lens 32. Objective lens 32 is a telecentric type made of a plurality of elements. A right angle prism 34 turns the optical axis 90° parallel but displaced from the azimuth or rotational axis about which the pitch prism 30 is rotated. An aspheric corrector field lens 36 comprising the two elements shown compensates for the negative geometrical magnification of the wide angle objective. Magnification is increased as the angle of the optical axis increases to present a rectilinear image of a rectilinear object. Two path folding mirrors 38 direct the lower optical path back to the center of rotation of the pitch prism. A lower projection lens 40 is focused on the primary image at the aspheric correctors and collimates the rays entering a dove prism 42. The elements of the optical pickup enumerated heretofore are all mounted in a servo-operated azimuth-yaw bearing 44. They can be rotated in bearing 44 to simulate changes in azimuth and yaw of the aircraft. The dove prism 42 is mounted in a bearing 46 and can be servo driven to simulate aircraft roll. A movement is also imparted to the dove prism 42 automatically by computer 12 to compensate for unwanted image rotation which arises when the preceding elements are operated to simulate pitch and azimuth-yaw movements. An upper projection lens 48 partially converges the collimated light from dive prism 42 onto the elements of a zoom lens assembly 52. An iris diaphragm 50 is mechanically geared to zoom lens 52 to compensate for image brightness changes which occur with changes in the equivalent focal length of the zoom lens. This prevents excessive illumination of the face of the vidicon 8 at maximum simulated range. A solenoid operated shutter 56 is provided to prevent vidicon image burn-in during readiness standby periods.

In operation, ship model 2 is controlled by ship model control 4 which receives commands from computer 12 to simulate the movements of a ship at sea. The effects of heave, pitch, roll, forward speed, etc., may be simulated in ship model 2 as well as aircraft 3. Computer 12 also controls gantry 5, optical pickup 6, zoom lens system 20, and other components in a well-known manner so that the effects of wind, ship speed, aircraft speed, aircraft controls, etc., combine to give a trainee pilot looking at display 10 a realistic impression of being in an actual aircraft making a landing approach on an aircraft carrier. Several known computers can be arranged to perform the control functions required of computer 12. One suitable computer is the SEL Model 840A which is available from Systems Engineering Laboratories, of Fort Lauderdale, Fla. These devices are not part of this invention. The subject invention comprises the combination of the optical pickup and zoom lens together with the combination of television displays and vidicons cooperating with mechanical moving means such as gantry 5 to simulate landing approaches at greater ranges with greater realism than is attainable with prior art simulators.

The arrangement of entrance pitch prism 30 which can be rotated by computer controlled servo means (not shown) to simulate pitch of the aircraft 3, together with the arrangement of azimuth-yaw bearing 44 which permits the rotation of all of the optical elements 30–40 by computer controlled servo means, make the effects of pitch, yaw, and changes in azimuth in aircraft 3 more precise, effective, and economical of apparatus than the arrangements found in prior art simulators. The effectiveness of the entrance pitch prism 30 and azimuth-yaw bearing 44 is made possible by the inclusion in the combination of the dove prism 42 which is rotated in bearing 46 by computer controlled servos to automatically compensate for the undesired image rotation which arises from the pitch and azimuth-yaw movement of entrance pitch prism 30 and azimuth-yaw bearing 44. An additional independent rotation of dove prism 42 is effected by computer controlled servo means to simulate roll in aircraft 3.

The unique combination of gantry 5 with the zoom lens 52 in optical pickup 6 and the zoom lens 20 make the extensive range simulation of the system possible. To simulate the effect of aircraft 3 maneuvering near carrier 2, that is, at a distance of up to 1,800 feet, apparent changes in the aircraft range, altitude, and azimuth with respect to carrier 2 are effected by movement in the X, Y, and Z directions of optical pickup 6 and vidicon 8 which are mounted on and moved by gantry 5. This movement is effected by computer controlled servo means not shown. To simulate changes in distance between aircraft and carrier at extended ranges, computer controlled servos may operate the zoom lens 52 in optical pickup 6 to simulate ranges between the limits of the gantry travel and up to approximately 4,500 feet. When ranges between approximately 4,500 and 3,000 feet are simulated, the zoom lens 20 is controlled to adjust the range. Simultaneously switch 14 is actuated by a signal from computer 12 to connect display 16, zoom lens 20, and vidicon 18 into the video circuit to display 10. In this mode of operation the video information from vidicon 8 which is affected by the adjustment of zoom lens 52 is displayed on display 16. The information displayed on 16 is picked up by vidicon 18 through zoom lens 20 and presented on display 10. The combined effects of the electro-optical system comprising the zoom lens 52 and 20, displays 16 and 10, and vidicons 8 and 18 thus make it possible to simulate changes in range of far greater magnitude than attainable by prior art electronic or optical range adjusting systems. The changes in range and the effects of pitch, roll, and changes in azimuth are simulated with greater realism and with far less equipment than in prior art devices.

What is claimed is:

1. In an aircraft simulator training device wherein an image is presented on a television display, the improvement comprising:
   a first display;
   a first vidicon arranged to transmit an image to said first display;
   optical elements comprising an entrance pitch prism rotatably mounted in a first bearing, an objective lens, a path folding prism, an aspheric lens, a first path folding mirror, a second path folding mirror, a lower projection lens, a first zoom lens system, said optical elements being rotatably mounted in a second bearing, and arranged in an optical path to transmit an image from said entrance pitch prism to said first vidicon;
   control means for controlling rotation of said rotatably mounted optical elements in said optical path to simulate pitch, change in azimuth, and yaw, in said image;
   a dove prism in said optical path rotatably mounted in a third bearing, means whereby said control means control rotation of said dove prism to simulate roll in said image; and
   means whereby said control means control rotation of said dove prism to eliminate undesired rotation of said image caused by operation of said rotatably mounted optical elements in said optical path to simulate pitch, change in azimuth, and yaw, in said image.

2. The apparatus of claim 1, and including a second display, a second zoom lens system, a second vidicon, and switch means whereby said image can be selectively transmitted from said first vidicon to said first display via said second display, said second zoom lens system, and said second vidicon, or directly from said first vidicon to said first display.